United States Patent
Hindelang et al.

(10) Patent No.: US 11,377,564 B2
(45) Date of Patent: Jul. 5, 2022

(54) METHOD FOR PRODUCING HYDROPHOBIC SILICA GRANULES

(71) Applicant: WACKER CHEMIE AG, Munich (DE)

(72) Inventors: Konrad Hindelang, Munich (DE); Dominik Jantke, Burghausen (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 113 days.

(21) Appl. No.: 16/481,863

(22) PCT Filed: Feb. 27, 2017

(86) PCT No.: PCT/EP2017/054467
§ 371 (c)(1),
(2) Date: Jul. 30, 2019

(87) PCT Pub. No.: WO2018/153493
PCT Pub. Date: Aug. 30, 2018

(65) Prior Publication Data
US 2019/0375942 A1     Dec. 12, 2019

(51) Int. Cl.
*C09C 1/30* (2006.01)
*C01B 33/18* (2006.01)

(52) U.S. Cl.
CPC ............ *C09C 1/3081* (2013.01); *C01B 33/18* (2013.01); *C09C 1/309* (2013.01); *C09C 1/3036* (2013.01); *C01P 2004/50* (2013.01)

(58) Field of Classification Search
CPC ..... C09C 1/3081; C09C 1/3036; C09C 1/309; C01B 33/18; C01P 2004/50
See application file for complete search history.

(56) References Cited

U.S. PATENT DOCUMENTS

| | | | |
|---|---|---|---|
| 3,738,785 A | 6/1973 | Reinhardt et al. | |
| 2003/0162881 A1* | 8/2003 | Panz | B01J 2/30 524/493 |
| 2010/0179269 A1* | 7/2010 | Schachtely | C09C 1/3036 524/492 |
| 2010/0254876 A1* | 10/2010 | Kneisel | C09C 1/3081 423/335 |
| 2012/0020106 A1* | 1/2012 | Doshi | C09C 1/3081 362/551 |
| 2012/0286189 A1 | 11/2012 | Barthel et al. | |
| 2012/0322893 A1 | 12/2012 | Drexel et al. | |
| 2015/0368440 A1 | 12/2015 | Scholz et al. | |
| 2016/0082415 A1 | 3/2016 | Drexel et al. | |

FOREIGN PATENT DOCUMENTS

| | | |
|---|---|---|
| DE | 1807714 B1 | 6/1970 |
| DE | 102007020716 A1 | 11/2008 |
| DE | 102007059862 A1 | 6/2009 |
| DE | 102009054566 A1 | 11/2010 |
| DE | 102010003204 A1 | 12/2011 |
| DE | 102012211121 A1 | 1/2014 |
| EP | 1813574 A1 | 8/2007 |
| EP | 2781558 A1 | 9/2014 |

* cited by examiner

*Primary Examiner* — Colin W. Slifka
*Assistant Examiner* — Michael Forrest
(74) *Attorney, Agent, or Firm* — Brooks Kushman P.C.

(57) ABSTRACT

Granular and/or shaped hydrophobic silica useful for thermal insulation materials are prepared by mixing hydrophilic silica with a hydrophobicizing agent at low temperature so the hydrophobicizing agent does not appreciably react, followed by deaeration and compaction.

9 Claims, No Drawings

METHOD FOR PRODUCING HYDROPHOBIC SILICA GRANULES

CROSS REFERENCE TO RELATED APPLICATIONS

This application is the U.S. National Phase of PCT Appln. No. PCT/EP2017/054467 filed Feb. 27, 2017, the disclosure of which is incorporated in its entirety by reference herein.

BACKGROUND OF THE INVENTION

1. Field of the Invention

The invention relates to a process for producing hydrophobic silica granular materials at low temperature.

2. Description of the Related Art

Thermal insulation for saving energy has attained high importance in the context of consciousness for sustainable development and the increasing cost of energy and also an increasing shortage of fossil raw materials. These requirements for optimization of thermal insulation apply equally to buildings, i.e. to new buildings or existing buildings, and to thermal insulation in the logistical or stationary sector.

For durable insulation which has low thermal conduction and also low combustibility, the focus is increasingly on inorganic, porous materials.

Organic insulating materials (e.g. polystyrene) are increasingly coming under pressure because of their combustibility and sometimes problematical disposal. It is therefore desirable to produce insulating materials having a very low combustibility.

Porous, inorganic materials such as pyrogenic or precipitated silicas display good insulation properties and are also noncombustible.

Pyrogenic silicas are prepared by flame hydrolysis of volatile silicon compounds, e.g. organic and inorganic chlorosilanes, in a hydrogen and oxygen flame. The silicas prepared in this way have a porous structure and are hydrophilic.

Precipitated silicas are prepared from water glass by a precipitation process. The term water glass refers to vitreous, i.e. amorphous, water-soluble sodium, potassium and lithium silicates solidified from a melt or aqueous solutions thereof. Neutralization of the salt, hydrolysis and condensation forms particulate $[SiO_{4/2}]$ compounds from the chain-like Si—O—Si compounds.

Such particulate systems have good thermal insulation properties even in a loose bed without compaction. In the building sector, the finely divided structure of the precipitated or pyrogenic silicas leads to difficulties in processing, for instance severe dust formation. The flowability of very finely divided substances is likewise restricted.

DE 10 2010 003 204 A1 demonstrates that silicas can be converted by means of compaction, i.e. granulation, into a form which is improved for many applications. The support materials obtained display good flowability but are hydrophilic.

For use as thermal insulation, in particular in the insulation of buildings, such hydrophilic granular materials are, however, not readily usable since hydrophilic silicas display undesirably high moisture absorption, as a result of which the thermal insulation properties, inter alia, decrease.

It is therefore desirable for applications in insulation of buildings to use hydrophobic insulation materials in order to reduce the water absorption and therefore loss of the thermal insulation effect.

Completely hydrophobic thermal insulation is obtained, for example, by applying the hydrophobicizing agent to the silica before pressing. Thus, DE 10 2009 054 566 A1, describes the production of completely hydrophobic thermal insulation by pressing mixtures of silica, fibers and relatively nonvolatile organosilanes or organosiloxanes. Volatile components are subsequently removed by baking ([0025]+ examples). However, the heat treatment step incurs additional costs.

DE 10 2007 020 716 A1 describes hydrophobic hollow building block fillings produced from silicas which are coated with volatile organosilanes and are then pressed. A problem here is the liberation of dissociation products, in particular volatile organic degradation products.

Both the foregoing processes (DE 10 2009 054 566 A1 and DE 10 2007 020 716 A1) give boards which are hydrophobic throughout and have very good insulating properties. However, free-flowing granular materials are preferred for many applications, but these are not provided by the processes disclosed.

DE 10 2012 211 121 A1 discloses a process for producing hydrophobic granular materials based on silica, by firstly producing hydrophilic granular materials. These are subsequently surface-modified by spraying-on of an organosilane and subsequent heat treatment at 130° C. The granular materials obtained display a high adsorption capability for enzymes.

Although the subsequent spraying hydrophobicizes the regions close to the surface, the total pore system in the interior of the particles is not satisfactorily hydrophobicized, which is a disadvantage for use as insulating material for building applications.

Completely hydrophobic granular materials would be obtained by compaction of hydrophobic silicas. However, a person skilled in the art will know (DE 10 2007 020 716 A1: paragraph [0024]) that hydrophobic silicas can no longer be compacted to give stable moldings because of the small proportion of Si—OH groups. This could also be confirmed by appropriate comparative examples (comparative example 3 and 7).

It is an object of the invention to provide an economical process which can be carried out continuously for producing hydrophobic granular materials.

SUMMARY OF THE INVENTION

The invention provides a process for producing hydrophobic silica granular materials, wherein i) a mixture containing hydrophilic silica is coated with hydrophobicizing agent at a temperature of not more than 55° C., ii) the mixture from step i) is, after a storage time of not more than 30 days, deaerated and iii) the mixture from step ii) is compacted to a target bulk density, iv) where granulation takes place during the compaction in step iii).

DETAILED DESCRIPTION OF THE PREFERRED EMBODIMENTS

The process gives mechanically stable granular materials in a simple way. The hydrophobicizing agent reacts completely only during or after the compaction step iii.

It has surprisingly been found that silica freshly coated with a suitable hydrophobicizing agent behaves like hydrophilic silica with respect to its suitability for granulation. This special effect is lost when the coated silica is heated. It is stated in EP 2 781 558 A1 that a silica coated at low temperatures with a short-chain OH-terminated polydimethylsiloxane has a significantly lower hydrophobicity (determined via methanol wettability) compared to a heated silica. In addition, it is stated that the hydrophobicity increases slowly during storage. An advantage of this silica compared to the prior art is said to be shorter incorporation times into rubbers. A positive effect on the compaction properties, for example for producing insulation materials, is not disclosed.

The process disclosed in the present invention has surprisingly allowed the hydrophobicizing agent to be mixed in before the compaction step. The hydrophobicizing agent is therefore also present in the core of the granular material. The processing properties during the granulation are not adversely affected here. As a result, standard equipment can be used for the granulation and complicated process steps such as subsequent hydrophobicization and heating can be dispensed with.

Since preference is given to using hydrophobicizing agents which do not eliminate any volatile organic compounds (VOCs) in the reaction with the Si—OH groups, no heat treatment (also referred to as purification) for removing the volatile constituents (e.g. elimination products) has to be carried out after coating and granulation.

In order for the coated silica to be able to be compacted efficiently and for stable granular materials to be formed, it is ensured that the temperature in step i of the coating procedure is not more than 55° C., preferably not more than 40° C., and most preferably not more than 25° C.

The temperature in all process steps, in the time between coating and deaeration, in the time between deaeration and granulation, during the granulation and comminution and screening, is preferably not more than 55° C., more preferably not more than 40° C., particularly preferably not more than 25° C.

Apart from an improved compactability and improved product properties, these temperature conditions make it possible for fines to be recirculated to steps i) to iii). In addition, energy costs can be saved compared to the processes with heating and/or purification steps. The process can, in particular, be carried out continuously in all steps because of the low temperatures and the omission of pressure change.

Silica

All hydrophilic silicas known to those skilled in the art can be used in the processes of the invention. Preference is given to using pyrogenic silicas or precipitated silicas or mixtures thereof. Further preference is given to silicas having a BET surface area in accordance with DIN 66131 (determined using nitrogen) in the range from 50 to 800 m$^2$/g, more preferably from 100 to 500 m$^1$/g and in particular silicas having a surface area in the range from 150 to 400 m$^2$/g. For the purposes of the present invention, hydrophilic means that the Si—OH groups on the surface are accessible and the silicas can be wetted by water. Particular preference is given to using pyrogenic silicas having BET surface areas in the range from 150 to 400 m$^2$/g.

Additives

As further components, it is possible, in particular in step i), to add additives which can absorb, scatter or reflect thermal radiation in the infrared range. The latter are generally referred to as IR opacifiers. These opacifiers preferably have a maximum in the IR spectral range at from 1.5 to 10 m. The particle size of the opacifiers is preferably 0.5-15 μm. Examples of such substances are preferably titanium oxides, zirconium oxides, ilmenites, iron titanates, iron oxides, zirconium silicates, silicon carbide, manganese oxides and carbon black.

Furthermore, in order to reduce electrostatic charging, all additives known to those skilled in the art for reducing electrostatic charging, for instance conductive alkylammonium salts, can be added if necessary.

For technical and/or economic reasons, further fillers can be added. Preference is here given to using synthetically produced modifications of silicon dioxide, e.g. aerogels, precipitated silicas, electric arc silicas, and SiO$_2$-containing fly dusts which are formed by oxidation of volatile silicon monoxide in the electrochemical production of silicon or ferrosilicon. Likewise, silicas which are produced by leaching of silicates such as calcium silicate, magnesium silicate and mixed silicates, for example olivine, with acids, are suitable. Naturally occurring SiO$_2$-containing compounds such as diatomaceous earths and kieselguhrs are also employed. In order to be able to ensure good processability (e.g. flowability and granulatability) of the silicon-containing mixture, in a preferred embodiment the addition of fibers is dispensed with.

The mixture containing hydrophilic silica which is coated with hydrophobicizing agent in step i) preferably contains at least 80% by weight, more preferably at least 90% by weight, and in particular at least 95% by weight, of hydrophilic silica.

Hydrophobicizing Agent

As hydrophobicizing agents, it is possible to use all materials known to those skilled in the art for hydrophobicizing silicas, in particular organosilicon compounds (e.g. organosilanes, organosiloxanes or silicone resins) and hydrocarbons (e.g. paraffins, waxes, carboxylic acids, in particular fatty acids). Reactive organosilanes, organosiloxanes or silicone resins which are liquid at 25° C. and have hydrophobicizing properties and are capable of reacting with the Si—OH groups of the silica surface are preferably used as hydrophobicizing agents.

The hydrophobicizing agents can be used in pure form or in any mixtures.

The reactivity of the hydrophobicizing agents is preferably selected so that the hydrophobicizing effect has not been developed completely before the compaction step ii).

Preference is given to using organosilanes, organosiloxanes or silicone resins which, during the reaction with the Si—OH groups of the silica, eliminate not more than 1% (more preferably, not more than 0.1%, most preferably not more than 0.01%) of volatile organic and/or corrosive compounds, based on the mass of the mixture, with these compounds preferably being CH$_3$OH, CH$_3$CH$_2$OH, CH$_3$COOH, HCl, or NH$_3$.

As hydrophobicizing agents, preference is given to using organosilanes of the general formula $$R^1_n R^2_m SiX_{4-(n+m)} \qquad (I),$$

where n and m can be 0, 1, 2, or 3 and the sum of n+m is less than or equal to 3 and R$^1$ is a saturated or monounsaturated or polyunsaturated, monovalent Si—C-bonded C$_1$-C$_{20}$-hydrocarbon radical which may optionally be substituted by —CN, —NCO, —NR$^3$, —COOH, —COOR$^3$, -halogen, -acryl, -epoxy, —SH, —OH or —CONR$^3_2$, preferably a C$_1$-C$_{18}$-hydrocarbon radical, or an aryl radial or C$_1$-C$_{15}$-hydrocarbonoxy radial, preferably a C$_1$-C$_8$-hydrocarbonoxy radial, more preferably a C$_1$-C$_4$-hydrocarbonoxy radical, in which in each case one or more nonadjacent methylene units can be replaced by —O—, —CO—, —COO—, —OCO— or —OCOO—, —S— or —NR$^3$— end groups and in which one or more nonadjacent methine units can be replaced by —N=, —N=N— or —P=groups, where $R^2$ is hydrogen or a saturated or monounsaturated or polyunsaturated, monovalent Si—C-bonded $C_1$-$C_{20}$-hydrocarbon radial which may optionally be substituted by —CN, —NCO, —NR$^3{}_2$, —COOH, —COOR$^3$—, -halogen, -acryl, -epoxy, —SH, —OH or —CONR$^3{}_2$, preferably a $C_1$-$C_{18}$-hydrocarbon radical, or an aryl radical or $C_1$-$C_{15}$-hydrocarbonoxy radical, preferably a $C_1$-$C_8$-hydrocarbonoxy radical, more preferably a $C_1$-$C_4$-hydrocarbonoxy radical, in which in each case one or more nonadjacent methylene units can be replaced by —O—, —CO—, —COO—, —OCO— or —OCOO—, —S—, or —NR$^3$— groups and in which one or more nonadjacent methine units can be replaced by —N=, —N=N— or —P=groups, where $R^3$ has the same meaning as $R^2$, and $R^2$ and $R^3$ can be identical or different, X is a C—O bonded $C_1$-$C_{15}$-hydrocarbon radical, preferably a $C_1$-$C_8$-hydrocarbon radical, more preferably a $C_1$-$C_3$-hydrocarbon radical, or an acetyl radical or a halogen radical, preferably chlorine, or hydrogen or an OH radical, or

$$R^{11}{}_iR^{22}{}_jSi-Y-SiR^{11}{}_iR^{22}{}_j \quad (II)$$

where $R^{11}$ has the meaning of $R^1$ and $R^{22}$ has the meaning of $R^2$, i and j can be 0, 1, 2 or 3 and the sum of i+j is 3 and Y can be the group NH or —O—.

Preference is given to using chain-like or cyclic, branched or unbranched organosiloxanes consisting of building blocks of the general formulae

$(R^4{}_aZ_bSiO_{1/2})$ (III-a)

$(R^4{}_2SiO_{2/2})$ (III-b)

$(R^4SiO_{3/2})$ (III-a)

$(R^4R^5SiO_{2/2})$ (III-d)

$(SiO_{4/2})$ (III-e)

where the building blocks can be present in any mixtures, where $R^4$ has the meaning of $R^1$ and $R^5$ has the meaning of $R^2$, and Z has the meaning of X and can in each case be identical or different, and a and b can be 0, 1, 2, or 3, with the proviso that the sum of a+b is 3.

Preference is given to using cyclic organosiloxanes.

Preference is also given to using chain-like organofunctional organopolysiloxanes preferably consisting of 2 building blocks of the general formula III-a and preferably from 1 to 100,000 building blocks of the general formula III-b and preferably from 1 to 500 building blocks of the general formula III-d, preferably from 1 to 50,000 building blocks of the general formula III-b and preferably from 1 to 250 building blocks of the general formula III-d, more preferably from 1 to 10,000 building blocks of the general formula III-b and preferably from 1 to 200 building blocks of the general formula III-d, and most preferably from 1 to 5000 building blocks of the general formula III-b and from 1 to 100 building blocks of the general formula III-d, where $R^4$ is preferably methyl and $R^3$ is preferably —CH$_2$—CH$_2$—CH$_2$—NH$_2$ or —CH$_2$—CH$_2$—NH—CH$_2$—CH$_2$—NH$_2$.

Preference is given to using chain-like organopolysiloxanes which preferably consist of 2 building blocks of the general formula III-a and preferably from 1 to 100,000 building blocks of the general formula III-b, preferably from 1 to 50 000 building blocks of the general formula III-b, more preferably from 1 to 10,000 building blocks of the general formula III-b, and most preferably from 1 to 5000 building blocks of the general formula III-b, where $R^4$ is preferably methyl. Particular preference is given to using chain-like organosiloxanes whose $R^4$ is preferably methyl and where Z is preferably —OH.

The kinematic viscosity of the organosiloxanes measured at 25° C. is preferably from 1 mm$^2$/s to 100,000 mm$^2$/s, preferably from 2 mm$^2$/s to 10,000 mm$^2$/s and more preferably from 5 mm$^2$/s to 1000 mm$^2$/s.

Especial preference is given to using OH-terminated polydimethylsiloxanes which preferably have a kinematic viscosity measured at 25° C. of from 5 mm$^2$/s to 100 mm$^2$/s. Preference is also given to using crosslinked or partially crosslinked organopolysiloxanes known as silicone resins; these are preferably organopolysiloxanes which contain building blocks of the general formula III-a and building blocks of the general formula III-e, particularly preferably with $R^4$=methyl, a=3 and b=0, or organopolysiloxanes which preferably contain building blocks of the general formula III-c and building blocks of the general formula III-b, more preferably with $R^4$=methyl.

Amount of Hydrophobicizing Agent

The amounts of hydrophobicizing agent added in step i) depend on the specific surface area (BET surface area) of the silicas, the proportion of these in the mixture, the type of silanes or siloxanes and also the hydrophobicity necessary for the end application. The amount added is preferably in the range from 0.5 to 20% by weight, more preferably from 1 to 15% by weight, most preferably from 5 to 10% by weight, in each case based on the total mixture.

Production of the Mixture

In a preferred embodiment, the components are mixed. The hydrophobicizing agent is preferably added in liquid form during production of the mixture; here, it is necessary for intimate mixing of the individual components to take place. Adsorption of the hydrophobicizing agent is preferably effected by spraying of the silica with the liquid hydrophobicizing agent in a moving bed or in a fluidized bed.

The temperature is generally selected so that the hydrophobicizing agent used does not yet react completely with the silanol groups of the silica surface during the mixing operation in step i) and before compaction. As a result of this temperature setting, the coated silica behaves largely like a hydrophilic silica in respect of processability in terms of compaction, in particular granulation. This is critical for the production of granular materials having an optimal combination of hydrophobicity and mechanical stability. If this temperature is exceeded even for only a few hours, the silica mixture behaves like a hydrophobic silica, e.g. HDK silica having a comparable carbon content in respect of the granulatability (see also example 3 compared to comparative example 2 compared to comparative example 3 and example 14 pass B compared to comparative example 9).

The addition rate and the after-stirring time for the hydrophobicizing agent are generally selected so that intimate mixing is ensured.

The mixture is stored only briefly after step i) and before deaeration in step ii). The storage time of the mixture is generally selected so that the hydrophobicizing agent used does not yet react completely with the silanol groups of the silica surface during the mixing process, before deaeration and before compaction (see also example 3 compared to comparative example 4 and example 14 pass B compared to comparative example 8).

The storage time until deaeration is preferably not more than 15 days, more preferably not more than 1 week, in particular not more than 3 days, and very preferably not more than 24 hours. Especial preference is given to the material being deaerated immediately. The material is preferably compacted and granulated immediately after deaeration.

Deaeration

Since silicas, in particular pyrogenic silicas, or silica-containing mixtures usually have very low bulk densities, the challenge in the production of granular materials consists in removing the air. Deaeration of the mixture from step i) results in the moldings obtained not expanding again and disintegrating after the pressing operation.

Satisfactory deaeration can, for example, be achieved by very slow compaction (see examples 3-9). Such slow compaction steps are not economically feasible for large-scale, in particular continuous, production. It is therefore advantageous to deaerate the silica actively. This can, for example, be effected by use of reduced pressure. Here, a decrease in volume of the mixture can take place during deaeration. The deaeration and subsequent compaction and granulation can be carried out either in different apparatuses or in one apparatus which performs both functions.

Compaction

After production of the mixture in step i) and deaeration in step ii), the mixture is brought to the desired density by compaction or pressing in step iii). This is necessary in order to set the pore size in accordance with optimal insulating effect and to be able to obtain mechanically stable granular materials. In general, a greater compaction leads to harder, more stable particles. This can be carried out by all methods known to those skilled in the art.

In order to be able to avoid additional process steps, shaping is preferably carried out simultaneously during compaction. Depending on the pressing process, a variety of shapes, sizes and size distributions can be obtained. For applications in the insulation of buildings, free-flowing powders or granular materials are frequently used. In general, the expression "granular materials" encompasses all shapes which can be produced from powders by means of the compaction devices known to those skilled in the art. Granular materials are preferably shapes which can be produced by compaction by means of rollers (smooth or perforated) (e.g. hats, flakes, platelets, rods, briquettes, tablets, pellets, balls, lenses, fragments, splinters). The average size of the particles of the granular material in at least one dimension, preferably two dimensions, more preferably in all three dimensions, is not more than 100 mm, more preferably not more than 50 mm, and in particular not more than 10 mm.

The average particle size (D50) of the granular materials is preferably in the range from 0.5 mm to 10 mm, more preferably in the range from 0.8 mm to 6.0 mm, and in particular in the range from 1.0 mm to 4.0 mm.

In order to be able to obtain granular materials having good insulating properties and stabilities, the granular materials are preferably compacted to target bulk densities of from 120 g/l to 350 g/l, more preferably from 120 g/l to 250 g/l, and in particular from 150 g/l to 200 g/l. The resulting thermal conductivity of the granular materials in the form of a loose bed is preferably not more than 35 mW/(m*K), more preferably not more than 30 mW/(m*K), yet more preferably not more than 28 mW/(m*K), and in particular not more than 26° mW/(m*K).

The mixture is firstly deaerated, during which a first compaction step for the material takes place. The bulk density after the first compaction and deaeration step is preferably above 70 g/l, more preferably above 90 g/l, and most preferably above 120 g/l. After deaeration, the mixture is brought to the target bulk density in a second compaction step. This is preferably carried out by means of rolling. Shaping preferably takes place at the same time.

Equipment known to those skilled in the art can be used for this purpose. Compaction is preferably carried out as dry compaction by pressing the mixture according to the invention between two rotating rollers in a compacting unit, with at least one roller, preferably both rollers, having depressions such as grooves, hollows or cushions. The rollers can be straight or concave. Furthermore, it can be advantageous for at least one roller to be configured so that a reduced pressure can be generated at the roller surface (filter roller), by means of which the mixture to be compacted is sucked onto the roller and thereby deaerated. After the sucking-on and deaeration, the compaction to the target density is preferably effected by means of a suitable counter-roller (pressing roller). For this purpose, it is possible for all appliances known to those skilled in the art, e.g. the Vacupress from Grenzebach BSH, to be used. The deaeration and compaction preferably take place in succession in one apparatus (see example 12). The silica can be fed to the compacting unit by means of all transport means known to those skilled in the art, for example transport screws or double screws. In a particularly preferred embodiment, funnels and transport screws which at least partly have surfaces (e.g. the screw itself, the wall or special internals) at which a reduced pressure can be generated so that deaeration takes place are preferably utilized for metering and transport.

The granulation of the silica is preferably carried out in a dry compactor having a downstream sieve granulator and sieve. The mixture initially charged can, e.g. in an apparatus from Hosokawa Bepex GmbH, be compacted and the compact material can be sieve-granulated and fractionated to the desired particle size fraction.

After compaction, the resulting hats and granular materials which exceed the size required for the application can be separated off and/or comminuted. This can be effected by all methods known to those skilled in the art, for example by crushing, classification or milling. The fragments obtained are subsequently separated into various particle size fractions. A sieve mill from Hosokawa Bepex GmbH, for example, can be used for this purpose.

Likewise, it is possible to separate off particles which are below the required size. Here, all methods known to those skilled in the art for sieving or classification of bulk materials can be employed. Separation of the various particle size fractions is preferably carried out by sieving. Particles which are too small can be disadvantageous for the end use, e.g. because of increased dust formation.

In contrast to other processes in which heat treatment is carried out during or after compaction, the fines can, after being separated off after step iv), be introduced into the preceding process steps, in particular into the deaerated mixture from step ii), and be recirculated to the compaction in step iii). Here, the fines are mixed with fresh material, i.e. material which has not been compacted to the target density, and thus be recirculated to the granulation (examples 10 and 13 F). This closed procedure is particularly advantageous for industrial implementation since no undesirable by-products or granulometric fractions are obtained in this way.

The formation of fines is preferably minimized in order to be able to achieve very high throughput in industrial processes. The particle size and the formation of fines can, for example, be influenced by the choice of pressing tools (e.g. roller shape) and the pressing force. The formation of particles smaller than 1 mm has been able to be reduced thereby, for example from 22% to 16% or 2% (see examples 13 B, 13 D, 14 A, 14 B).

After granulation, the hydrophobicizing agent can react with the silanol groups of the silica, as a result of which the hydrophobicity of the granular materials preferably increases. In a preferred embodiment, this is effected without heat treatment, e.g. by storage at room temperature. The storage time of the granular materials is, at room temperature, preferably at least 3 days, more preferably at least one week, and most preferably at least two weeks. This final hydrophobicization can also be accelerated by a increase in the temperature. In a preferred embodiment, the heat treatment of the granular materials is preferably carried out at a temperature of from 60 to 300° C. and more preferably from 70 to 130° C. Hydrophobicization subsequent to granulation can also be accelerated by addition of catalytically active substances. All compounds known to those skilled in the art for activating functional organosilicon compounds, for example Brønsted or Lewis acids, can be used for this purpose. Examples of Brønsted acids are hydrochloric acid, sulfuric acid or nitric acid, with preference being given to using hydrochloric acid as Brønsted acid. Lewis acids which can be used are, for example, tin or titanium compounds such as tin alkoxides or titanium alkoxides.

Use

The shaped silica bodies are preferably used in forms known to those skilled in the art for thermal or acoustic insulation. For example, the shaped silica bodies are employed as components in inorganic render systems, optionally in combination with further organic or inorganic binder systems, after further processing in the form of boards which can be used directly as insulating material, or, for example, as blow-in insulation for filling hollow spaces in masonry or for filling hollow building blocks.

EXAMPLES

In the following examples, all amounts and percentages are by weight, all pressures are 0.10 MPa (abs.) and all temperatures are 20° C., unless indicated otherwise in the particular case.

Determination of the Bulk Density

The bulk density of the granular materials is determined by a method based on DIN ISO 697. For this purpose, the material to be examined is poured into a vessel having a known volume (1 l). Material projecting above the top of the vessel is struck off by means of a lath. The weight of the bulk material is determined by weighing and the bulk density is calculated therefrom.

Determination of the Thermal Conductivity

The determination of the thermal conductivity of the granular materials is carried out at room temperature in the form of a loose bed using a THB transient hot bridge analyzer (THB-100) from Linseis using an HTP sensor (measurement time 120 seconds, measurement current: 17.50 mA, current for temperature measurement 5.00 mA). Calibration of the sensor was carried out using a reference having a thermal conductivity of 25.0 mW/(K*m) For the measurement, the sensor is introduced into a loose bed of the material to be examined. It is ensured here that the sensor is covered on both sides by the material.

Qualitative Test for Hydrophobicity

The assessment of hydrophobicity is carried out one week after granulation. For this purpose, 1 g of the hydrophobic silica granular material is introduced into 100 ml of water and shaken in a closed vessel and then stored for 24 hours at 60° C. The assessment is carried out as follows:

+ Hydrophobic: granular materials are barely wettable by water and float completely on the water surface.
o Partially hydrophobic: granular materials are wettable, but mostly float on the water surface.
− Not hydrophobic: granular materials are immediately wettable and sink downward in the water within a few minutes.

Assessment of Mechanical Stability

To qualitatively assess the mechanical stability of the granular materials obtained, particles smaller than 1 mm are firstly separated off by means of hand sieving. 10 g of the sieved granular materials are introduced into a 1 l screw-cap bottle, shaken for one minute and thus subjected to mechanical stress. In addition, whether they remain in shape on being taken from the press or after passage through the roller and also during sieving or disintegrate again to a fine powder or particles is assessed. The following assessments are used here:

+ stable, little abrasion, virtually no fines formation on shaking, after granulation and sieving
o moderately stable, abrasion and fracture are observed
− little stability, abrasion and fracture as a result of low stresses are observed, significant amounts of fines formed Determination of Carbon Content The determination of the carbon content (C content) of the samples is carried out on a Leco CS 230 analyzer. The analysis is carried out by high-frequency combustion of the sample in a stream of oxygen. Detection is carried out by means of nondispersive infrared detectors.

Particle Size Analysis

The particle size analysis is carried out by a method based on DIN 66165. The average particle diameter (D50) is read off from the cumulated distribution curve. Sieving is carried out by hand.

The proportion of particles larger than 1 mm is likewise determined by means of sieving. For this purpose, a weighed amount of granular material is sieved by means of a 1.0 mm sieve (hand sieving). The proportion of particles larger and smaller than 1 mm is determined by weighing of the fractions.

Sources:

HDK® T30: hydrophilic, pyrogenic silica from Wacker Chemie AG having a BET surface area of 300 $m^2/g$.

HDK® N20: hydrophilic, pyrogenic silica from Wacker Chemie AG having a BET surface area of 200 $m^2/g$.

HDK® T30P: hydrophilic, pyrogenic silica from Wacker Chemie AG having a BET surface area of 300 $m^2/g$ and a density of about 100 g/l.

HDK® H18: hydrophobic, pyrogenic silica from Wacker Chemie AG having a BET surface area of 170-230 $m^2/g$, a density of about 50 g/l and a C content of 4-5.2%.

OH-terminated PDMS: OH-terminated polydimethylsiloxane from Wacker Chemie AG having a kinematic viscosity in the region of 30-35 $mm^2/s$.

All further laboratory chemicals were procured from customary suppliers.

Laboratory Tests

Description of the Coating:

Coating Method A

The mixture consisting of silica and additives is intensively stirred at 25° C. for 10 minutes, so that the material is fluidized. The organosiloxane is atomized through a two-fluid nozzle and sprayed onto the fluidized silica. After coating, a free-flowing powder is obtained which is stored at room temperature for a maximum of 3 days.

Coating Method B

10% of the mixture to be used, consisting of silica and additives, is intensively stirred at 25° C. for 10 minutes, so that the material is fluidized. The organosiloxane is subsequently added dropwise to the mixture while stirring. In selecting the stirrer and the stirring time, attention is paid to ensuring that very little organosiloxane remains on the vessel walls. This can, for example, be checked by coloring the organosiloxane and by weighing the resulting mixture and if necessary optimized.

After coating, a free-flowing powder (masterbatch) is obtained. In a larger stirring apparatus, the remaining amount of the mixture consisting of silica and additives is intensively stirred at room temperature. The masterbatch is sprinkled into this mixture while stirring. After the coating, a free-flowing powder is obtained, which is stored at room temperature for a maximum of 3 days.

Compositions:

Mixture A
HDK T30: 1.0 kg
OH-terminated polydimethylsiloxane (viscosity 35 mm$^2$/s):
0.15 kg
C content of the mixture: 4.2%
Bulk density: 60 g/l Mixture B
HDK T30: 1.0 kg
OH-terminated polydimethylsiloxane (viscosity 35 mm$^2$/s): 0.1 kg
C content of the mixture: 3.0%
Bulk density: 60 g/l Mixture C
HDK T30: 1.0 kg
OH-terminated polydimethylsiloxane (viscosity 35 mm$^2$/s): 0.075 kg
C content of the mixture: 2.2%
Bulk density: 50 g/l Mixture D
HDK T30: 1.0 kg
Silicon carbide powder: 0.05 kg
OH-terminated polydimethylsiloxane (viscosity 35 mm$^2$/s): 0.1 kg
Bulk density: 65 g/L Mixture E
HDK T30: 0.8 kg
PERKASIL® GT3000: 0.2 kg
OH-terminated polydimethylsiloxane (viscosity greater than 35 mm$^2$/s): 0.1 kg
Bulk density: 90 g/L Mixture F
HDK N20: 1.0 kg
OH-terminated polydimethylsiloxane (viscosity greater than 35 mm$^2$/s): 0.1 kg
Bulk density: 60 g/L Description of Granulation in the Laboratory (Method A)

The mixture produced in the coating is introduced on the day of coating at room temperature into a hollow cylinder having a nonwoven filter at the bottom. A reduced pressure is applied to the nonwoven filter, as a result of which the bed is deaerated. During this, the bed volume decreases by about 30-50%.

The predensified mixture is introduced into a pressing mold. The bottom plate and the punch are perforated, i.e. provided with recesses (corrugated profile). The punch is pushed by means of a press into the pressing mold in order to bring the mixture to the target density. The target density is controlled via the amount of mixture introduced. The assessment of the hydrophobicity is carried out one week after granulation. Any hats larger than 10 mm formed are separated off on a sieve and comminuted until they pass the 10 mm sieve.

Description of Granulation in the Laboratory (Method 8)

The mixture produced in the coating is introduced on the day of coating at room temperature into a pressing mold. The bottom plate and the punch are perforated, i.e. provided with recesses (corrugated profile). The punch is pushed into the pressing mold by means of a press in order to bring the mixture to the target density. The target density is controlled by means of the amount of mixture introduced. The advance of the punch has to be selected so that the air can exit slowly around the periphery of the punch (deaeration) without large amounts of the fine silica escaping. For thorough deaeration, the advance of the punch is interrupted for about 10 minutes at about 80-90% of the desired target density (deaeration via the gap between punch and pressing mold). Subsequently, the mixture is compacted to the target density and a hold time of about 10 minutes is allowed to elapse before removal from the mold. The assessment of the hydrophobicity is carried out one week after granulation. Any hats larger than 10 mm formed are separated off by means of a sieve and comminuted until they pass the 10 mm sieve.

Examples 1-9

The mixture specified in the table is subjected appropriately to the specified method for coating and the specified method for granulation and is subsequently characterized and assessed.

Example 10

A granular material corresponding to example 4 is comminuted to a size below 1 mm. This granular material (30%) is intensively mixed with fresh material of the mixture B (70%) in a stirrer and compacted in accordance with example 4.

Comparative Example 1 (not According to the Invention)

HDK T30 is granulated without further pretreatment in accordance with method A.

Comparative Example 2 (not According to the Invention)

mixture A, produced by method A, is stored after production for 6 hours at 60° C. and subsequently compacted by method B. The granules largely disintegrate to a fine powder on being taken from the mold.

Comparative Example 3 (not According to the Invention)

HDK H18 is granulated without further pretreatment in accordance with method B. The granules largely disintegrate to a fine powder on removal from the mold.

Comparative Example 4 (not According to the Invention)

Mixture A, produced by method A, is stored after production for three months at room temperature and subsequently compacted in accordance with method B. The granules partly disintegrate into smaller fragments on removal from the mold.

Comparative Example 5 (not According to the Invention)

Mixture B, produced by method A, is granulated by method B, with only a small degree of compaction being selected (<100 g/L). The granules largely disintegrate to a fine powder on removal from the mold.

Table 1 shows the analytical data for the laboratory tests:

TABLE 1

| Example | Composition | Coating method | Granulation method | Bulk density [g/L] | λ value [mW/K * m] | Hydrophobicity | Stability |
|---|---|---|---|---|---|---|---|
| 1 | A | A | A | 145 | 26 | + | + |
| 2 | A | B | A | 152 | 26 | + | + |
| 3 | A | A | B | 139 | 25 | + | + |
| 4 | B | A | B | 151 | 26 | + | + |
| 5 | B | A | B | 122 | 25 | + | ○ |
| 6 | C | A | B | 145 | 26 | ○ | + |
| 7 | D | A | B | 150 | 26 | + | + |
| 8 | E | A | B | 144 | 29 | + | ○ |
| 9 | F | A | B | 162 | 27 | + | + |
| 10 | X | X | X | 154 | 27 | + | + |
| Comp. 1* | X | X | A | 160 | 28 | − | + |
| Comp. 2* | X | X | B | 141 | 26 | + | − |
| Comp. 3* | X | X | B | 136 | 25 | + | − |
| Comp. 4* | X | X | B | 140 | 26 | + | ○ |
| Comp. 5* | B | A | B | 97 | 27 | + | − |

X: see description of the individual examples or comparative examples
*not according to the invention Production Tests

Continuous Coating of the Silica (Example 11)

HDK T30 is introduced continuously by means of a screw into a reactor having multistage stirrers. In the reactor, the silica is mixed intensively (fluidized) and sprayed with an OH-terminated polydimethylsiloxane (viscosity 35 mm$^2$/s) by means of two-fluid nozzles. The coated silica is taken off continuously at the bottom. The residence time is about 30 minutes. The rate of addition of the hydrophobicizing agent is set so that the content of OH-terminated polydimethylsiloxane is about 15% by weight. A free-flowing powder having a bulk density in the range 40-70 g/L and a C content of about 4.5% is obtained.

Continuous Compaction Using a Pressing Roller (Example 12)

The mixture produced in the production experiment (example 11) is compacted on a vacuum pressing roller (VACUPRESS from Grenzebach) immediately after production. The vacuum pressing roller consists of a filter roller to which a subatmospheric pressure can be applied to deaerate the material and a counter-roller which compresses the deaerated material to the target density. The coated silica is here sucked at room temperature onto the rotating filter roller, deaerated and during further passage through the apparatus is compacted by means of a counter-roller to the target density. The compaction can be set via the contact pressure and the speed of rotation of the rollers. An increase in the contact pressure and a decrease in the speed of rotation (longer contact time with the filter roller and thus better deaeration) lead to an increase in the bulk density.

Table 2 shows the analytical data for example 12:

| Passage | Speed of rotation of rollers [rpm] | Bulk density | Proportion > 1.0 mm [%] | D50 [mm] | λ value [mW/K * m] | Hydrophobicity | Stability |
|---|---|---|---|---|---|---|---|
| A* | 3.0 | 100 | 40 | 0.8 | 26 | + | − |
| B | 2.0 | 120 | 50 | 1.0 | 25 | + | ○ |
| C | 1.1 | 150 | 80 | 2.0 | 25 | + | + |

*not according to the invention

Continuous Compaction Using a Granulator (Example 13)

The material to be granulated is compacted further by means of a compactor from HOSOKAWA (Alpine Kompaktor ARC L 200/50).

Here, the material is conveyed via a funnel and a screw onto the actual granulation unit (two contrarotating rollers having a corrugated profile 6.0 mm). A reduced pressure (0.2 bar) is applied to the barrel of the screw in order to be able to additionally deaerate the material to be compacted. The compaction can be controlled via the contact pressure (able to be regulated via the speed of rotation of the screw and of the roller). The respective pressing pressures are shown in table 3. The hats are subsequently comminuted gently to a size of less than 4 mm using an Alpine Flake Crusher AFC 200. The proportion of particles larger than 1 mm is determined by sieving (mesh opening 1.0 mm). The fraction larger than 1.0 mm is utilized for determining the bulk density and the thermal contactivity.

Passage A-E: The material precompacted by means of the pressing roller from example 12 (bulk density ~100 g/L) is granulated in accordance with the experimental method.

Passage F: The fines from passage B (example 13) is mixed with fresh material (material from passage A of example 12), so that the proportion of fresh material is 80%. The material is converted in accordance with the experimental method.

Passage G: The material which has not been precompacted from example 11 is deaerated and compacted in accordance with the experimental method. The material is introduced via a funnel into the barrel of the screw. In the barrel of the screw, the material is deaerated by means of reduced pressure. The throughput is reduced in comparison with passages A-F (use of deaerated materials), so that deaeration is achieved during transport in the barrel of the screw. Further compaction and granulation again occur between the rollers.

Passage H: The material from passage G is compressed again in accordance with the experimental method.

Passage I (comparative example 6): a hydrophilic silica having a bulk density of 100-120 g/L (HDK T30P from Wacker Chemie AG) is compacted in accordance with the experimental method.

Passage J (comparative example 7): a hydrophobic silica having a bulk density of 50 g/L (HDK H18 from Wacker Chemie AG) is compacted as in passage G. A significant proportion is not granulated but is obtained as fines. The hats obtained disintegrate virtually completely in the comminution step and cannot be sieved without destruction. Further analysis is therefore omitted. The bulk density is, in contrast to the preceding passages, not determined using the fractions larger than 1.0 mm but instead using the product before sieving. The analytical data for example 13 are shown in table 3:

| Passage | Pressing pressure [N/mm$^2$] | Bulk density [g/L] | Proportion > 1.0 mm [%] | λ value [mW/K * m] | Hydrophobicity | Stability |
|---|---|---|---|---|---|---|
| A | 0.60 | 128 | 70 | 25 | + | ○ |
| B | 0.65 | 145 | 78 | 25 | + | + |
| C | 0.80 | 174 | 81 | 26 | + | + |
| D | 1.0 | 194 | 78 | 28 | + | + |
| E | 2.0 | 228 | 79 | 30 | + | + |
| F | 0.80 | 180 | 80 | 26 | + | + |
| G | 0.55 | 134 | 71 | 25 | + | ○ |
| H | 0.75 | 169 | 79 | 25 | + | + |
| I* | 0.70 | 149 | 81 | 28 | − | + |
| J* | 0.55 | 109 | x | x | + | − |

*not according to the invention

Continuous Granulation Using a Granulator (Example 14)

The material to be granulated is granulated by means of a compactor from HOSOKAWA (Alpine Kompaktor ARC L 200/50) as described in example 13. Instead of the corrugated profile, the rollers are equipped with a lens profile (6.0 mm). The comminution step using the AFC 200 is omitted. The proportion of particles larger than 1 mm is determined by sieving (mesh opening 1.0 mm). The determination of the bulk density and the thermal conductivity is carried out using the unsieved product.

Passage A, B: The precompacted material from example 12 (passage A, bulk density ~100 g/L) is granulated in accordance with the experimental method.

Passage C (comparative example 8) not according to the invention: the material from example 12 passage A (precompacted to about 100 g/L) is stored after production for three months at room temperature. The material is subsequently granulated using the settings of passage B. The granules obtained display only a low mechanical stability and partly disintegrate during sieving.

Passage D (comparative example 9) not according to the invention: the material from example 12 passage A (precompacted to about 100 g/L) is stored at 60° C. for six hours before granulation and subsequently granulated using the settings of passage B. The granules obtained display only a very low mechanical stability. Destruction-free sieving is not possible, so that a sieve analysis is not carried out.

The analytical data for example 14 are shown in table 4:

| Passage | Pressing pressure [N/mm$^2$] | Bulk density [g/L] | Proportion > 1.0 mm [%] | D50 [mm] | λ value [mW/K * m] | Hydrophobicity | Stability |
|---|---|---|---|---|---|---|---|
| A | 0.9 | 150 | 83 | 2.8 | 26 | + | + |
| B | 1.5 | 195 | 98 | 4.1 | 29 | + | + |
| C* | 1.5 | 186 | 65 | 2.5 | 28 | + | − |
| D* | 1.5 | 174 | x | x | 27 | + | − |

*not according to the invention

Example 15

In a round-bottom flask, 15 g of dimethyldiethoxysilane (WACKER® SILAN M2-DIETHOXY from Wacker Chemie AG), 0.5 g of Ti(OiPr)4 and 10 g of HDK® T30 are mixed to form a free-flowing powder. This powder mixture is mixed further for 20 minutes with a further 45 g of HDK T30 in a high-speed mixer (4000 rpm). The powder mixture is subsequently converted in accordance with method A for granulation in the laboratory. The granular material obtained is stored at 25° C. for two weeks before further analysis (bulk density: 134 g/L; λ value: 24 mW/K*m; Hydrophobicity: +; Stability: +).

Example 16

In a round-bottom flask, 7.5 g of methyltriethoxysilane (WACKER® SILAN M1-TRIETHOXY from Wacker Chemie AG), 7.5 g of dimethyldiethoxysilane, 0.5 g of Ti(OiPr)4 and 10 g of HDK® T30 are mixed to form a free-flowing powder. This powder mixture is mixed further for 20 minutes with a further 45 g of HDK T30 in a high-speed mixer (4000 rpm). The powder mixture is subsequently converted in accordance with method A for granulation in the laboratory. The granular material obtained is stored at 25° C. for two weeks before further analysis (bulk density: 131 g/L; λ value: 24 mW/K*m; Hydrophobicity: +; Stability: +).

Example 17

In a round-bottom flask, 10 g of aminopolydimethylsiloxane (WACKER® L 655 SILICONE FLUID from Wacker Chemie AG) and 10 g of HDK® T30 are mixed to form a free-flowing powder. This powder mixture is mixed further for 20 minutes with a further 80 g of HDK® T30 in a high-speed mixer (4000 rpm). The powder mixture is subsequently converted in accordance with method A for granulation in the laboratory. After production, the granular material obtained is heated at 150° C. for 30 minutes. (Bulk density: 145 g/L; λ value: 25 mW/K*m; Hydrophobicity: +; Stability: +).

The invention claimed is:

1. A process for producing hydrophobic silica granular insulation materials, comprising the following steps, in the order given:
   i) coating a mixture consisting of hydrophilic silica, optionally one or more IR opacifiers, optionally one or more antistatic agents, and optionally one or more fillers other than hydrophilic silica, with a hydrophobing composition consisting of organosilicon compounds which eliminate not more than 1 wt. %, based on the weight of the hydrophobing composition, of volatile organic compounds, HCl, or ammonia, selected from the group consisting of organosilanes, organosiloxanes, silicone resins, and mixtures thereof,
   ii) after not more than 24 hours, deaerating the mixture from step i),
   iii) compacting the mixture from step ii) to a target bulk density, and
   iv) granulating during the compaction in step iii),
wherein at least steps i) and ii) are conducted at temperatures of 55° C. or less.

2. The process of claim 1, wherein the hydrophobing composition consists of a cyclic organosiloxane.

3. The process of claim 1, wherein the hydrophobing composition consists of OH-terminated organopolysiloxanes.

4. The process of claim 1, wherein at least steps i) and ii) are conducted at temperatures of 40° C. or less.

5. The process of claim 1, further comprising:
   v) screening granulate from step iv) to remove fines and recirculating the removed fines to step i).

6. The process of claim 5, wherein all steps are conducted at temperatures of 40° C. or less.

7. The process of claim 1, wherein following deaeration, the bulk density of the deaerated coated silica is >70 g/L.

8. The process of claim 1, wherein the thermal conductivity of the granulates is ≤30 mW/m·K.

9. The process of claim 1, wherein the coated silica obtained in step i) is a free-flowing powder.

* * * * *